US007433647B2

(12) United States Patent
LeMense et al.

(10) Patent No.: US 7,433,647 B2
(45) Date of Patent: Oct. 7, 2008

(54) TRANSMIT ANTENNA MULTIPLEXING FOR VEHICULAR PASSIVE ENTRY SYSTEMS

(75) Inventors: Thomas J. LeMense, Farmington, MI (US); Riad Ghabra, Dearborn Heights, MI (US); Qingfeng Tang, Novi, MI (US)

(73) Assignee: Lear Corporation, Southfield, MI (US)

( * ) Notice: Subject to any disclaimer, the term of this patent is extended or adjusted under 35 U.S.C. 154(b) by 566 days.

(21) Appl. No.: 11/127,560

(22) Filed: May 12, 2005

(65) Prior Publication Data

US 2006/0279467 A1 Dec. 14, 2006

(51) Int. Cl.
*H04B 5/00* (2006.01)

(52) U.S. Cl. .................... 455/41.1; 455/41.2; 455/41.3; 455/345; 340/5.61

(58) Field of Classification Search ................ 455/41.2, 455/41.1, 345, 41.3; 340/5.61
See application file for complete search history.

(56) References Cited

U.S. PATENT DOCUMENTS

| | | | | |
|---|---|---|---|---|
| 3,718,932 | A | 2/1973 | Ikrath et al. | |
| 4,521,913 | A * | 6/1985 | Huber et al. | 455/121 |
| 4,689,803 | A * | 8/1987 | Johannessen et al. | 375/304 |
| 5,034,697 | A | 7/1991 | Johnson | |
| 6,041,083 | A * | 3/2000 | Larsson et al. | 375/304 |
| 2001/0033222 | A1* | 10/2001 | Nowottnick et al. | 340/5.61 |
| 2003/0076093 | A1* | 4/2003 | Lourens et al. | 324/247 |
| 2005/0046546 | A1 | 3/2005 | Masudaya | |
| 2005/0237160 | A1* | 10/2005 | Nolan et al. | 340/10.33 |
| 2006/0114100 | A1* | 6/2006 | Ghabra et al. | 340/5.61 |

FOREIGN PATENT DOCUMENTS

| | | |
|---|---|---|
| EP | 0539262 | 7/1967 |
| GB | 1076838 | 3/1968 |
| GB | 1170890 | 11/1969 |

OTHER PUBLICATIONS

Analog Microelectronics, *Voltage/Current Converter AM422*, Apr. 1999, pp. 1-10.

(Continued)

*Primary Examiner*—Sanh D Phu
(74) *Attorney, Agent, or Firm*—MacMillan, Sobanski & Todd, LLC

(57) ABSTRACT

An antenna coupler for a wireless communication system in a vehicle couples a transmit signal source to a plurality of antennas arranged within the vehicle. A first saturable reactor has a first load winding and a first control winding wound on a first saturable core, the first load winding coupling the signal source to a first antenna. A first current source is coupled to the first control winding for providing a selected current to the first control winding. A second saturable reactor has a second load winding and a second control winding wound on a second saturable core, the second load winding coupling the signal source to a second antenna. A second current source is coupled to the second control winding for providing a selected current to the second control winding. A controller is coupled to the first and second current sources for commanding the first and second selected currents to selectably attenuate or non-attenuate a transmit signal from the transmit signal source to each respective antenna.

16 Claims, 4 Drawing Sheets

OTHER PUBLICATIONS

STMicroelectronics, *Three Terminal Adjustable Current Sources*, May 2003, pp. 1-11.

Dallas Semiconductor Maxim, *Programmable Current Source Delivers 0A To 5A*, Jul. 9, 1998.

Burr-Brown Corporation, *Implementation and Applications of Current Sources and Current Receivers*, Mar. 1990, pp. 1-29.

Analog Devices, Inc., *Isolated, Field Configurable Analog Input*.

* cited by examiner

TRANSMIT ANTENNA MULTIPLEXING FOR VEHICULAR PASSIVE ENTRY SYSTEMS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to multiplexing wireless broadcast signals among a plurality of antennas, and, more specifically, to a vehicular passive entry system driving selected ones of a plurality of antennas disposed in a vehicle.

It is well known in the automotive industry to provide for remote vehicle access, such as through the use of remote keyless entry (RKE) systems. RKE systems may be characterized as active or passive in nature. In an active system, a switch or pushbutton on a remote transmitter must be activated by an operator in order to have a desired remote function performed, such as locking or unlocking the vehicle doors. In contrast, a passive entry system does not require a pushbutton activation by an operator in order to have a desired remote function performed.

In remote entry systems, a portable transceiver is provided which is commonly referred to as a "fob" or a "card." Such a fob or card may be attached to a key chain as a separate unit, or may be part of the head of an ignition key. The fob may function as both an active and a passive unit, i.e., having push buttons for user-initiated functions and having automatically operated circuitry to perform any of a variety of passive functions (such as unlocking a vehicle door, enabling the vehicle engine, and/or activating internal and/or external vehicle lights).

Passive entry systems include a transceiver in an electronic control module installed in the vehicle. The vehicle transceiver and/or control module is provided in communication with various vehicle devices in order to perform a variety of functions. For example, the vehicle transceiver and/or control module may be provided in communication with a door lock mechanism in order to unlock a vehicle door in response to an unlock request, or may be provided in communication with the vehicle engine in order to start the engine in response to an engine start request.

Passive entry communication operates over a much shorter range than RKE communication (e.g., 1 meter as opposed to 30 meters). Therefore, an LF signal (e.g., 134 kHz) is used for passive entry while a much higher frequency RF signal (e.g., 315 MHz or 433 MHz) is used for RKE since the LF signal decays over a shorter range. In addition, transponders operative at LF frequencies are readily available. As used herein, LF frequencies range from about 30 kHz to about 300 kHz. RF signals used in RKE systems are typically in the UHF band from about 300 MHz to about 3 GHz.

For a passive system, a sensor or switch may be provided in a vehicle door handle in order to provide the unlock request. More particularly, when the vehicle owner makes physical contact with the door handle, such as by grasping or pulling the handle, such a sensor provides the vehicle transceiver and/or control module with an indication of such contact. The vehicle transceiver and/or control module automatically transmits a passive entry challenge signal. Upon receipt of the challenge signal, the remote transceiver fob or card carried by the user determines if the challenge signal is valid and, if so, automatically transmits a response which includes a unique identification code of the fob. The vehicle transceiver and/or control module compares the identification code with the codes of authorized fobs and if a match is found then the control module generates a control signal that is transmitted to the door lock mechanism for use in unlocking the vehicle door.

In performing passive entry functions, it is often necessary to localize (i.e., determine the location of) the user carrying the fob in deciding whether a particular passive entry function should be performed. For example, when the vehicle door handle is activated to generate a door unlock request, the lock should actually be unlocked only if an authorized fob is located in the vehicle exterior. Otherwise, the vehicle door could be unlocked and opened by anyone outside the vehicle merely because an authorized user is present inside the vehicle. By way of another example, if a user activates a passive engine start switch inside the vehicle, the engine should actually be started only if an authorized user is present inside the vehicle.

One known method for determining the location of a fob is to employ separate vehicle antennas arranged to radiate primarily in the interior of the vehicle and primarily in the exterior of the vehicle, respectively. Multiple outside antennas may also be provided in order to detect whether the user is located at a particular vehicle door or at the trunk of the vehicle so that the proper door or trunk lid can be opened. In one particular type of system, the portable fob measures the received signal strength of the interrogation signals (i.e., challenge signals) from each of the respective antennas and then includes the signal strength information as part of a response message to the vehicle. The vehicle module then compares the signal strength at which the fob received the interior and exterior transmitted interrogation signals in determining whether the fob is present in the interior or exterior regions of the vehicle.

The vehicle transceiver functions as a base station including a single transmitter that is coupled to each of the antennas in the antenna array. In order to transmit from antennas individually, an antenna coupler or multiplexer is coupled between the transmitter and the antennas. Known multiplexers use a plurality of mechanical or semiconductor switches for directing the transmission signal to each antenna.

Typical mechanical switches utilize make-and-break contacts that are controlled by relays. After many operating cycles, the make-and-break contacts wear out and may become permanently open or permanently closed. These failures reduce. the expected operating lifetime of the passive entry system.

Semiconductor switches are not subject to contact wear, however other problems are encountered. Since the semiconductor switches are connected in series between the transmitter and antenna, they carry the full current applied to the antennas. Higher currents necessitate using higher cost semiconductors. Moreover, nonlinearity of the switches leads to signal distortion that adds harmonic content to the antenna signals. The harmonics degrade system perform making communications less reliable and reducing communication range.

Prior antenna coupling methods either pass the full signal to an antenna or block it. If it is desired to deliver some intermediate signal magnitude to any particular antenna, then the transmitter must be adapted to provide a variable output. The added cost and complexity of the transmitter has discouraged the introduction of functions depending upon a variable output, such as transmitting simultaneously from multiple antennas while equalizing their relative outputs to shape the coverage area of an RF broadcast.

SUMMARY OF THE INVENTION

The present invention advantageously achieves multiplexing of antenna signals at lower cost, with reduced distortion and greater long term reliability while enabling the additional function of steering antenna signals proportionally to any selected ones of the antennas simultaneously with any equalization.

In one aspect of the invention, an antenna coupler for a wireless communication system in a vehicle couples a transmit signal source to a plurality of antennas arranged within the vehicle. A first saturable reactor has a first load winding and a first control winding wound on a first saturable core, the first load winding coupling the signal source to a first antenna. A first current source is coupled to the first control winding for providing a selected current to the first control winding. A second saturable reactor has a second load winding and a second control winding wound on a second saturable core, the second load winding coupling the signal source to a second antenna. A second current source is coupled to the second control winding for providing a selected current to the second control winding. A controller is coupled to the first and second current sources for commanding the first and second selected currents to selectably attenuate or non-attenuate a transmit signal from the transmit signal source to each respective antenna.

DETAILED DESCRIPTION OF PREFERRED EMBODIMENTS

Figure 1:
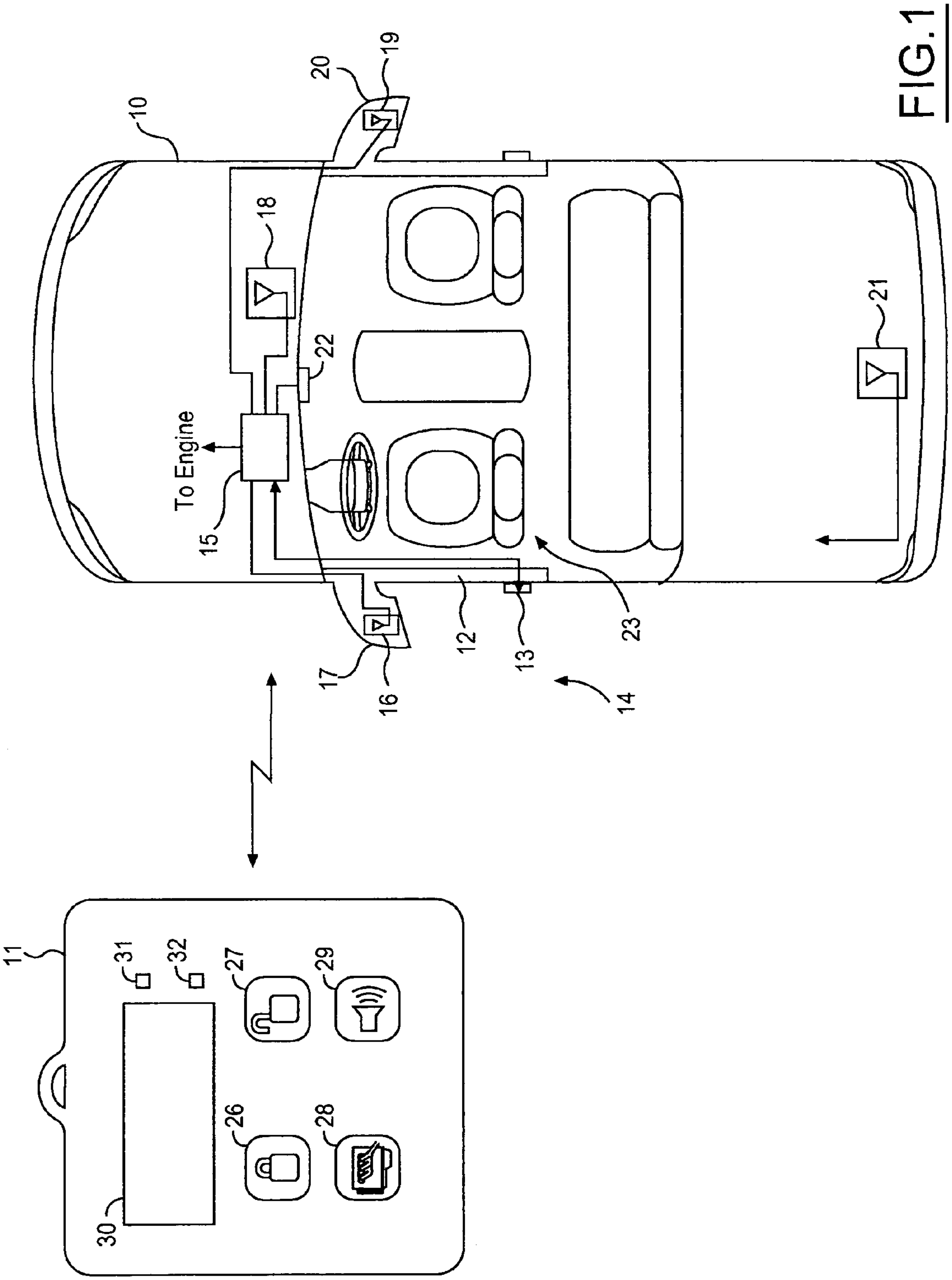
FIG. 1 is a system diagram showing a vehicle and a remote fob for a combined RKE and passive entry system.

Referring to FIG. 1, a vehicle 10 communicates with a plurality of remote fobs such as a fob 11 which operates as both an RKE button-operated transmitter and a passive entry transponder. Vehicle entry via a door 12 having a door latch 13 may be obtained when a user carrying fob 11 is present at an exterior region 14. A passive entry electronic module 15 functions as a base station that is coupled to an exterior antenna 16 (mounted in a driver's side view mirror 17), an interior antenna 18 (mounted in a vehicle instrument panel), an exterior antenna 19 (mounted in a passenger side view mirror 20, and a trunk-mounted exterior antenna 21.

Door latch module 13 may include an activation switch and a lock actuator mechanism which are both coupled to module 15. By lifting the door handle, a user generates a door unlock request that causes module 15 to interrogate for an authorized fob. An engine start switch 22 may also be provided on the instrument panel and is coupled to module 15 in order to generate a user request for starting the vehicle engine. Module 15 interrogates for an authorized fob within an interior region 23 (e.g., including the driver's seat) before starting the engine.

Fob 11 includes a lock button 26, an unlock button 27, an engine start button 28, and a panic alarm button 29 for transmitting corresponding commands as is known for conventional RKE systems. Fob 11 is a two-way device which can receive wireless data transmissions for controlling an LCD display 30 and LED indicator lights 31 and 32. Examples of remotely broadcast data include engine status, lock status, alarm status, and bearing information for a vehicle location system. Fob 11 also houses a transponder, receiving and transmitting devices, and a controller for performing passive entry functions as described in greater detail below.

Figure 2:
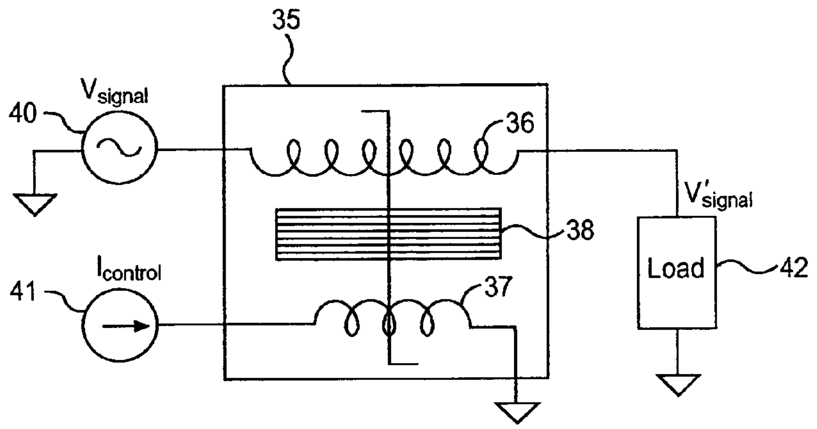
FIG. 2 is a schematic diagram showing a saturable reactor of the present invention for coupling a transmit signal to an antenna.

An antenna coupler of the present invention uses saturable reactors of the type shown in FIG. 2. A saturable reactor 35 has a load winding 36 and a control winding 37 mutually wound on a saturable core 38. A transmit signal source 40 is connected to the input of load winding 36 and a control current source 41 is connected to the input of control winding 37. The output of load winding 36 is coupled to ground through a load 42 such as an antenna. The output side of control winding 37 is also connected to ground.

Figure 3:
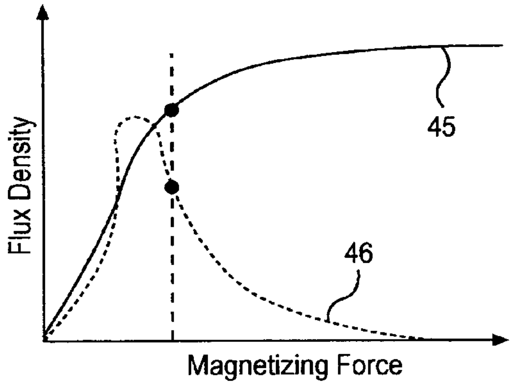
FIG. 3 includes plots showing magnetization of a core of a saturable reactor.

The B-H curve of a magnetic core is shown in FIG. 3. With increasing magnetizing force applied to the core, the flux density within the core increases as shown by line 45. For high levels of magnetizing force, the flux density reaches a maximum. Line 46 represents the permeability of the core. At levels of magnetizing force beyond the "knee" of line 45 indicated by the black dot, the permeability of the core dramatically decreases. In a saturable reactor, a dc current applied to the control winding has a magnitude that is selected to create a desired amount of flux in the core. An inductor wound on the same core experiences a variable inductance according to the permeability remaining in the core. At higher levels of dc control current, the inductance of the inductor can be dramatically decreased.

In the circuit of FIG. 2, as the control current $I_{control}$ increases, the reactor core material is saturated and the amount of signal delivered to load 42 increases due to the lowered inductance of load winding 36. Without a flow of control current (i.e., $I_{control}=0$), load winding 36 exhibits a higher inductance so that signals may be blocked from load 42. At intermediate amounts of current, intermediate amounts of the transmit signal from source 40 may be coupled to load 42.

Figure 4:
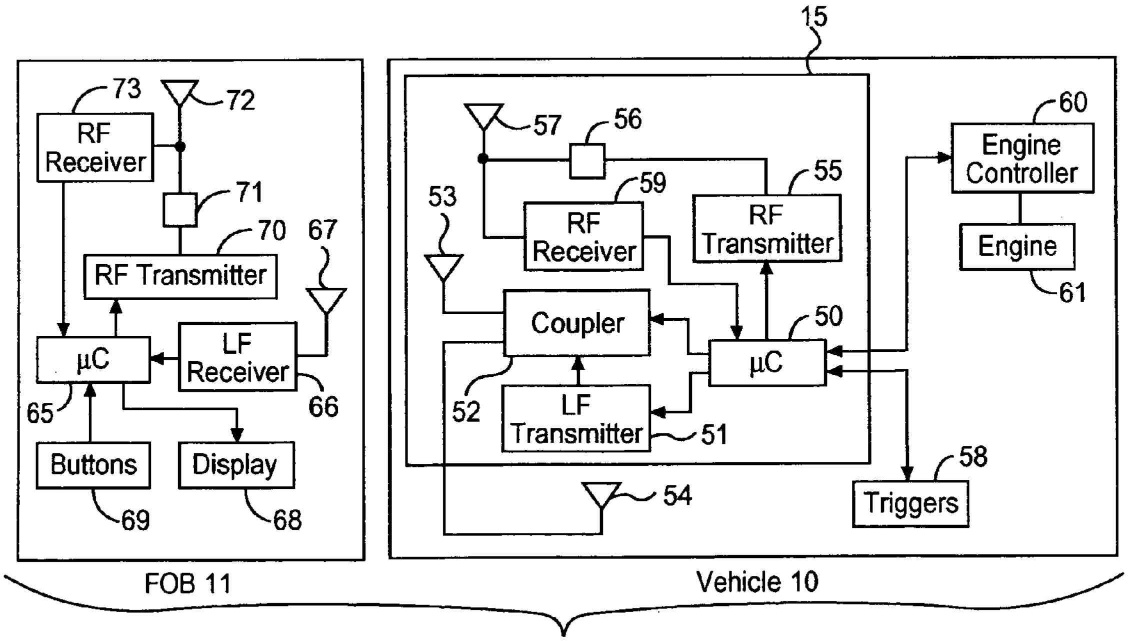
FIG. 4 is a block diagram showing the system of FIG. 1 in greater detail.

The system including an antenna coupler is shown in greater detail in FIG. 4. Vehicle 10 includes a base station or vehicle communication module 15 for communicating with remote portable fob 11. Base station 15 includes a microcontroller 50 coupled to an LF transmitter 51, an antenna coupler 52, an RF receiver 59, and an RF transmitter 55. Antenna coupler 52 is connected to a plurality of LF antennas including antenna 53 and antenna 54. LF antenna 53 is disposed within the vehicle interior by virtue of it being contained in base station 15 and antenna 54 is remotely located (e.g., in a side view mirror housing). An RF antenna 57 is coupled to RF receiver 59 as well as to RF transmitter 55 through a matching circuit 56.

Passive entry triggers 58 are coupled to microcontroller 50 and may include a sensing switch for detecting the lifting of a door handle and/or an engine start push button in the vehicle interior. Microcontroller 50 is further coupled to an engine controller 60 for controlling an engine 61. Microcontroller 50 receives vehicle status data from engine controller 60 (e.g., to confirm that the engine has successfully started in response to a remote engine start command) and from a door module (e.g., to confirm locking of the vehicle doors). The vehicle status data can be sent to portable fob 11 using a vehicle status message as part of a confirmation following execution of particular RKE commands, for example.

Portable fob 11 includes a microcontroller 65 coupled to input buttons 69 typically including separate push buttons for activating RKE commands for locking and unlocking doors, remotely starting or stopping an engine, panic alarm, and others. An RF transmitter 70 is coupled to an antenna 72 through a matching network 71. RKE commands initiated by depressing a push button 69 are broadcast by RF transmitter 70 and antenna 72. An RF receiver 73 is coupled to antenna 72 and microcontroller 65 for receiving UHF status messages broadcast by base station 11, such as engine running status for a remote start function. A display 68 is coupled to microcontroller 65 for displaying vehicle status data from a status message to a user.

An LF receiver 66 is coupled to microcontroller 65 and to an LF antenna 67 for detecting wakeup signals broadcast from various antennas on vehicle 10. Other communications may also be conducted using the LF channel (i.e., LF transmitter 51 and LF receiver 66), such as sending data to control display 68. In addition, an LF interrogation may be initiated by microcontroller 50 without a triggering action by the user, such as when periodically re-checking for the presence of the fob after a passive engine start has been conducted.

Figure 5:
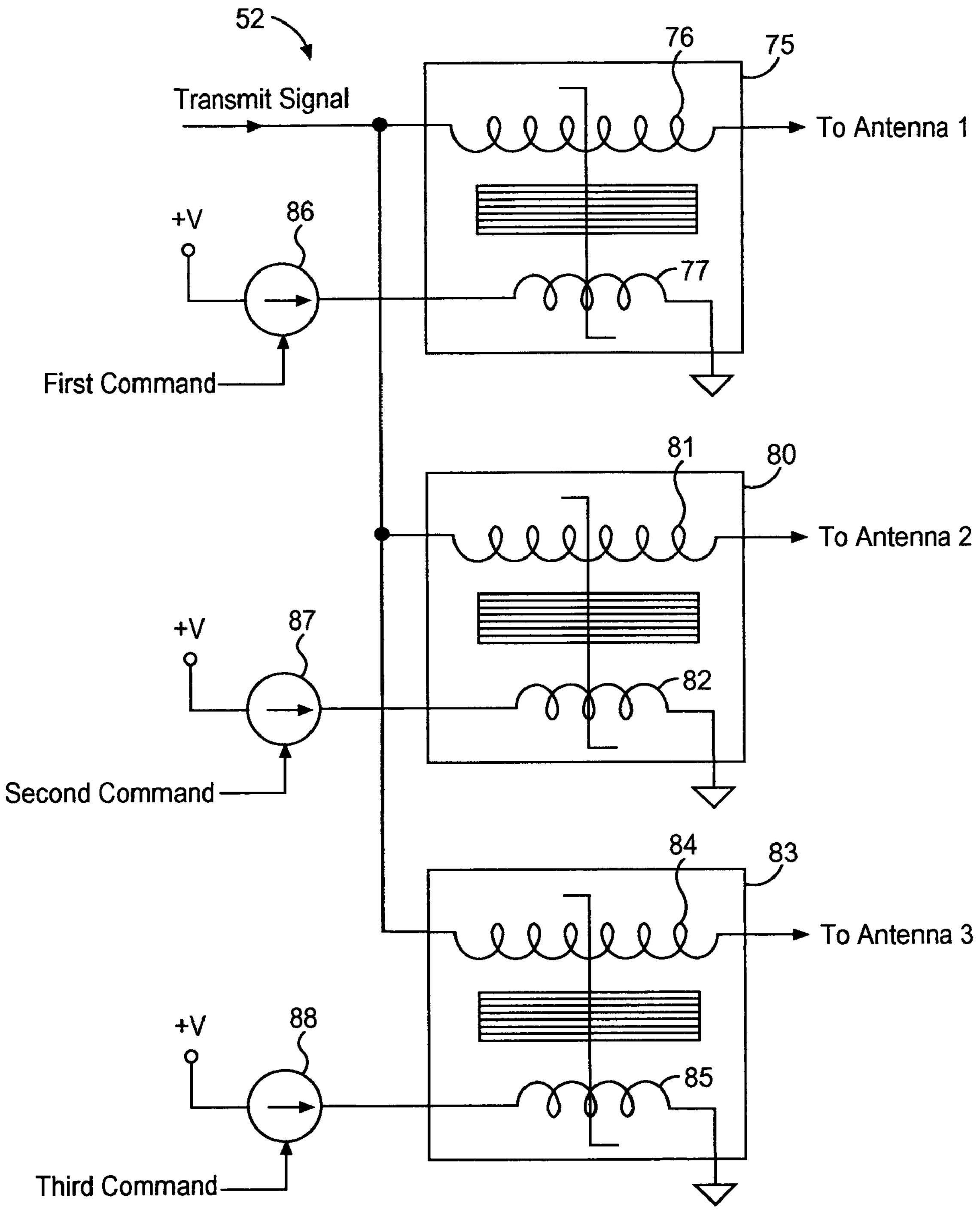
FIG. 5 is a schematic diagram showing one embodiment of the antenna coupler of the present invention.

FIG. 5 shows antenna coupler 52 in greater detail. A plurality of saturable reactors 75, 80, and 83 include load windings 76, 81, and 84 and control windings 77, 82, and 85, respectively. Each load winding 76, 81, and 84 receive the transmit signal at their input sides and are coupled to respective antennas on their output sides.

Saturable reactor 75 receives a first selected current from a first current source 86 having a magnitude determined by a first command from the microcontroller. Saturable reactor 80 receives a second selected current from a second current source 87 in accordance with a second command from the microcontroller, and saturable reactor 83 receives a third selected current from a third current source 88 according to a third command from the microcontroller. The first, second, and third commands may comprise binary commands (e.g., either a high logic level signal or a low logic level signal) so that each respective current source produces either 1) a predetermined saturation current whereby the transmit signal is coupled to the respective antenna substantially unattenuated or 2) a substantially zero current whereby the transmit signal is substantially not coupled to the respective antenna. The unattenuated transmit signal may be coupled to individual antennas one at a time or may be coupled to more than one antenna simultaneously depending upon the function being performed. When each selected current to a saturable reactor is comprised of either of a saturation current or zero current, each respective current source can be comprised of an integrated circuit current source, such as the LM234 integrated circuit available from ST Microelectronics.

Figure 6:
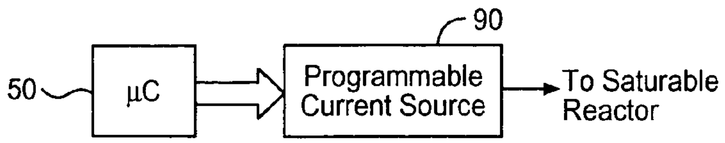
FIG. 6 is a block diagram showing an alternative embodiment of a current source for the antenna coupler.

In an alternative embodiment, a range of command values (i.e., having a resolution greater than just a binary decision) control each saturable reactor resulting in an intermediate amount of the transmit signal being coupled to each respective antenna. Thus, it is possible to control a relative signal transmission strength between different ones of the antennas (i.e., equalizing the broadcast from the multiple antennas). When varying the amount of signal delivered to one or more antennas, a current source such as shown in FIG. 6 may be employed. Microcontroller 50 is coupled by a data bus to a programmable current source 90. A multi-bit digital command from microcontroller 50 is interpreted by programmable current source 90 in order to generate a particular current value. Programmable current source 90 may be comprised of a D-A converter, a switch-mode step down regulator, and current-sense amplifier as is known in the art.

Figure 7:
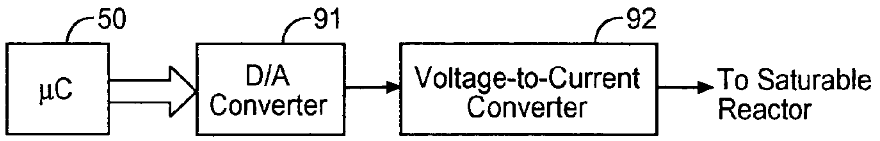
FIG. 7 is a block diagram showing another alternative embodiment of a current source for the antenna coupler.

FIG. 7 shows an alternative embodiment for a variable current source wherein microcontroller 50 provides a multi-bit command to a D-A converter 91. An analog command voltage is provided to a voltage-to-current converter 92. Voltage-to-current converters are available in integrated circuit form, such as the AM422 integrated circuit available from Analog Microelectronics.

Figure 8:
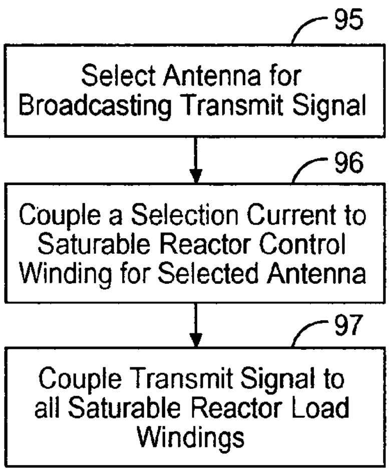
FIG. 8 is a flowchart of a method of the present invention.

A preferred method of the present invention is shown in FIG. 8. In step 95, an antenna is selected for broadcasting the transmit signal. For example, an interior or an exterior antenna is identified for interrogating a fob during a passive entry sequence such as passive door unlock or passive engine start. In step 96, a selection current is coupled to the saturable reactor control winding for the selected antenna(s). The transmit signal is then coupled to all saturable reactor load windings in step 97. Only the saturable reactor receiving a selection current will actually couple the transmit signal to a transmitting antenna. When attempting to localize a fob, antennas may preferably selected one at a time for individual transmission. At other times, more than one antenna may be selected for transmission.

Figure 9:
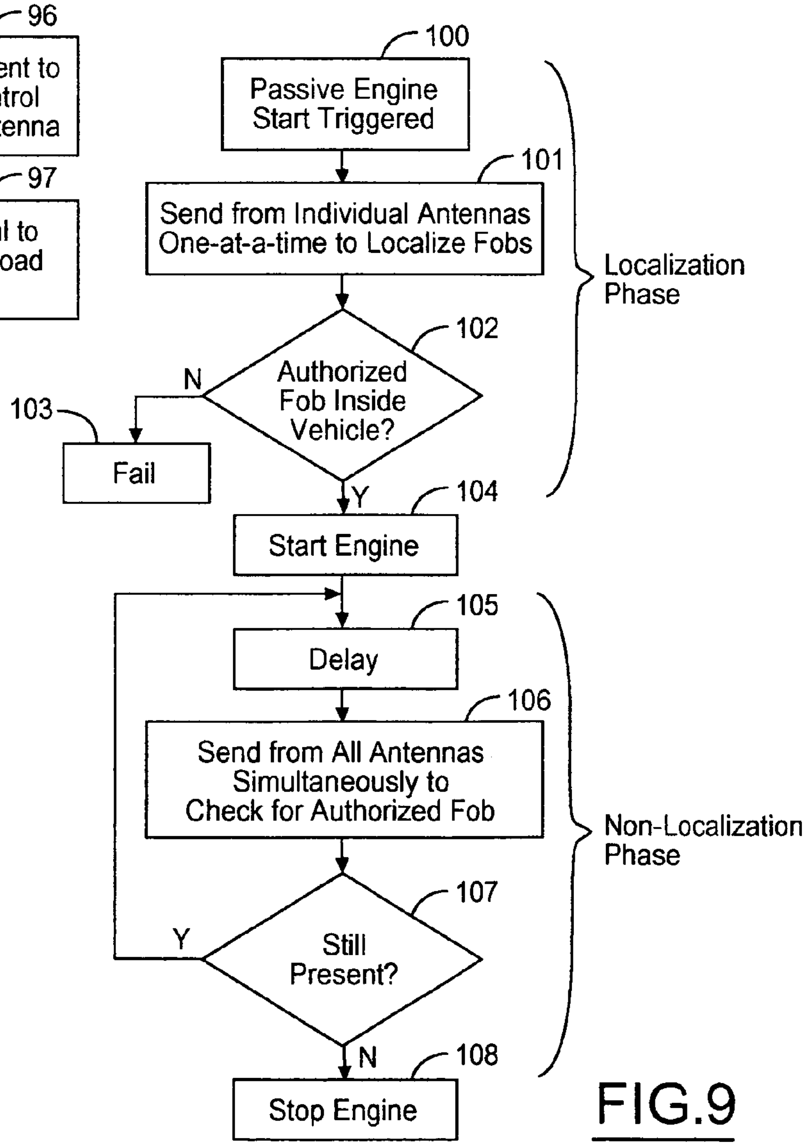
FIG. 9 is a flowchart of a method wherein transmit signals are coupled to individual antennas one-at-a-time during a localization phase for a passive entry system and to multiple antennas simultaneously during a non-localization phase.

FIG. 9 shows a method of the present invention wherein the antenna coupler is sometimes used to transmit from individual antennas one at a time, and at other times is used to send from more than one antenna simultaneously. For purposes of this example, a passive engine start function is shown. In step 100, a passive engine start sequence is triggered when an individual in the vehicle presses an engine start button. In order to determine whether an appropriate fob is located within the vehicle, the vehicle base station sends interrogation signals from individual antennas one at a time in step 101. Each fob in the vicinity of the vehicle responds to the interrogation signals and reports the received signal strength, thereby allowing the base station to detect in which region each fob is located. A check is made in step 102 to determine whether an authorized fob is inside the vehicle. Thus, steps 101 and 102 comprise a localization phase of this passive entry function.

If no authorized fob is found inside the vehicle, then the attempted passive engine start fails at step 103. If an authorized fob is found inside the vehicle, then the engine is started at step 104 and a non-localization phase of the passive entry function begins. After a delay 105, the base station sends interrogation signals in step 106 from all antennas simultaneously to check for the continued presence of the fob used to authorize the passive engine start. It is desirable in this non-localization phase to broadcast from all antennas simultaneously because of the reduced amount of time, improved coverage, and reduced electromagnetic interference. A check is made in step 107 to determine if the authorized fob is still present. If so, then a return is made to step 105. If not, then the engine is stopped at step 108.

By way of another example, a non-localization phase may include the broadcasting of data to the fob. Such a non-localization phase may or may not be preceded by a localization phase.

What is claimed is:

1. An antenna coupler for a wireless communication system in a vehicle for coupling a transmit signal source to a plurality of antennas arranged within said vehicle, said antenna coupler comprising:

a first saturable reactor having a first load winding and a first control winding wound on a first saturable core, said first load winding coupling said signal source to a first antenna;

a first current source coupled to said first control winding for providing a selected current to said first control winding;

a second saturable reactor having a second load winding and a second control winding wound on a second saturable core, said second load winding coupling said signal source to a second antenna;

a second current source coupled to said second control winding for providing a selected current to said second control winding; and a controller coupled to said first and second current sources for commanding said first and second selected currents to selectably attenuate or non-attenuate a transmit signal from said transmit signal source to each respective antenna.

2. The antenna coupler of claim 1 wherein said controller commands said first selected current to be a predetermined saturation current whereby said transmit signal is coupled to said first antenna substantially unattenuated.

3. The antenna coupler of claim 2 wherein said controller commands said second selected current to be substantially zero current whereby said transmit signal is substantially not coupled to said second antenna.

4. The antenna coupler of claim 1 wherein said first and second current sources are comprised of fixed current sources selectably activated by said controller.

5. The antenna coupler of claim 1 wherein said first and second current sources are comprised of voltage-to-current converters, and wherein said controller provides a respective analog command to each respective voltage-to-current converter corresponding to a respective selected current.

6. A method of multiplexing a transmit signal from a transmit signal source to a plurality of antennas arranged within a vehicle for a wireless communication system, wherein each of said antennas is coupled to said transmit signal source by a respective load winding of a respective saturable reactor, and wherein each saturable reactor includes a respective control winding, said method comprising the steps of:

selecting at least one of said antennas for broadcasting said transmit signal;

selecting at least one other of said antennas that will not broadcast said transmit signal;

coupling a selection current to said control windings of said saturable reactors that are coupled to said antennas selected for broadcasting said transmit signal;

coupling no current to said control windings of said saturable reactors that are coupled to said other antennas that will not broadcast said transmit signal; and coupling said transmit signal to said load windings of all of said saturable reactors.

7. The method of claim 6 wherein said step of selecting at least one of said antennas for broadcasting said transmit signal selects more than one antenna.

8. The method of claim 7 wherein said selection currents provided to said selected antennas have relative magnitudes to control a relative signal transmission strength between said selected antennas.

9. A passive entry system in a vehicle for interacting with a remote fob carried by a user of said vehicle, said system comprising:

a controller for generating transmit signals for reception by said remote fob;

a plurality of antennas arranged within said vehicle, each antenna being directed to a respective region with respect to said vehicle; and an antenna coupler comprising:

a first saturable reactor having a first load winding and a first control winding wound on a first saturable core, said first load winding coupling said signal source to a first antenna;

a first current source coupled to said first control winding for providing a selected current to said first control winding;

a second saturable reactor having a second load winding and a second control winding wound on a second saturable core, said second load winding coupling said signal source to a second antenna; and a second current source coupled to said second control winding for providing a selected current to said second control winding;

wherein said controller is coupled to said first and second current sources for commanding said first and second selected currents to selectably attenuate or non-attenuate said transmit signals to each respective antenna in order to localize said fob within said respective regions.

10. The system of claim 9 wherein said controller commands said first selected current to be a predetermined saturation current whereby said transmit signals are coupled to said first antenna substantially unattenuated.

11. The system of claim 10 wherein said controller commands said second selected current to be substantially zero current whereby said transmit signals are substantially not coupled to said second antenna.

12. The system of claim 9 wherein said first and second current sources are comprised of fixed current sources selectably activated by said controller.

13. The system of claim 9 wherein said first and second current sources are comprised of voltage-to-current converters, and wherein said controller provides a respective analog command to each respective voltage-to-current converter corresponding to a respective selected current.

14. The system of claim 9 wherein said interaction with said remote fob comprises a localization phase and a non-localization phase, and wherein said transmit signals are coupled to said first and second antennas one at a time during said localization phase and are coupled to said first and second antennas simultaneously during said non-localization phase.

15. The system of claim 14 wherein said localization phase includes initiating a passive engine start function when a user in located within said vehicle and wherein said non-localization phase includes an engine maintain function.

16. The system of claim 14 wherein said remote fob includes an information display and wherein said non-localization phase includes transmit signals for broadcasting data to said remote fob for controlling said information display.

* * * * *